United States Patent
Guthrie et al.

(10) Patent No.: US 7,386,678 B2
(45) Date of Patent: Jun. 10, 2008

(54) EFFICIENT SYSTEM BOOTSTRAP LOADING

(75) Inventors: Guy L. Guthrie, Austin, TX (US); Jeffrey W. Kellington, Austin, TX (US); Kevin F. Reick, Round Rock, TX (US); Hugh Shen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 11/168,715

(22) Filed: Jun. 28, 2005

(65) Prior Publication Data

US 2006/0294309 A1 Dec. 28, 2006

(51) Int. Cl.
*G06F 12/00* (2006.01)
(52) U.S. Cl. .................. 711/144; 711/154; 711/122
(58) Field of Classification Search .......... 711/144
See application file for complete search history.

(56) References Cited

U.S. PATENT DOCUMENTS 5,895,487 A * 4/1999 Boyd et al. ............. 711/122
2003/0126379 A1 * 7/2003 Kaushik et al. ......... 711/150
2006/0294309 A1 * 12/2006 Guthrie et al. .......... 711/118

OTHER PUBLICATIONS

Catcling Values in the Load Store Queue.*

* cited by examiner

*Primary Examiner*—Brian R Peugh
(74) *Attorney, Agent, or Firm*—Diana R. Gerhardt; Jack V. Musgrove

(57) ABSTRACT

An efficient system for bootstrap loading scans cache lines into a cache store queue during a scan phase, and then transmits the cache lines from the cache store queue to a cache memory array during a functional phase. Scan circuitry stores a given cache line in a set of latches associated with one of a plurality of cache entries in the cache store queue, and passes the cache line from the latch set to the associated cache entry. The cache lines may be scanned from test software that is external to the computer system. Read/claim dispatch logic dispatches store instructions for the cache entries to read/claim machines which write the cache lines to the cache memory array without obtaining write permission, after the read/claim machines evaluate a mode bit which indicates that cache entries in the cache store queue are scanned cache lines. In the illustrative embodiment the cache memory is an L2 cache.

5 Claims, 6 Drawing Sheets

EFFICIENT SYSTEM BOOTSTRAP LOADING

BACKGROUND OF THE INVENTION

1. Field of the Invention

The present invention generally relates to computer systems, and more particularly to an efficient method of loading values into a computer system as part of an initialization (bootstrap) routine.

2. Description of the Related Art

The basic structure of a conventional symmetric multi-processor computer system 10 is shown in FIG. 1. Computer system 10 has one or more processing units arranged in one or more processor groups; in the depicted system, there are four processing units 12a, 12b, 12c and 12d in processor group 14. The processing units communicate with other components of system 10 via a system or fabric bus 16. Fabric bus 16 is connected to one or more service processors 18a, 18b, a system memory device 20, and various peripheral devices 22. A processor bridge 24 can optionally be used to interconnect additional processor groups. System 10 may also include firmware (not shown) which stores the system's basic input/output logic, and seeks out and loads an operating system from one of the peripherals whenever the computer system is first turned on (booted).

System memory device 20 (random access memory or RAM) stores program instructions and operand data used by the processing units, in a volatile (temporary) state. Peripherals 22 may be connected to fabric bus 16 via, e.g., a peripheral component interconnect (PCI) local bus using a PCI host bridge. A PCI bridge provides a low latency path through which processing units 12a, 12b, 12c and 12d may access PCI devices mapped anywhere within bus memory or I/O address spaces. The PCI host bridge interconnecting peripherals 22 also provides a high bandwidth path to allow the PCI devices to access RAM 20. Such PCI devices may include a network adapter, a small computer system interface (SCSI) adapter providing interconnection to a permanent storage device (i.e., a hard disk), and an expansion bus bridge such as an industry standard architecture (ISA) expansion bus for connection to input/output (I/O) devices including a keyboard, a graphics adapter connected to a display device, and a graphical pointing device (mouse) for use with the display device. The service processors can alternately reside in a modified PCI slot which includes a direct memory access (DMA) path.

In a symmetric multi-processor (SMP) computer, all of the processing units 12a, 12b, 12c and 12d are generally identical, that is, they all use a common set or subset of instructions and protocols to operate, and generally have the same architecture. As shown with processing unit 12a, each processing unit may include one or more processor cores 26a, 26b which carry out program instructions in order to operate the computer. An exemplary processor core includes the Power5™ processor marketed by International Business Machines Corp. which comprises a single integrated circuit superscalar microprocessor having various execution units, registers, buffers, memories, and other functional units, which are all formed by integrated circuitry. The processor cores may operate according to reduced instruction set computing (RISC) techniques, and may employ both pipelining and out-of-order execution of instructions to further improve the performance of the superscalar architecture.

Each processor core 26a, 26b includes an on-board (L1) cache (typically, separate instruction and data caches) implemented using high speed memory devices. Caches are commonly used to temporarily store values that might be repeatedly accessed by a processor, in order to speed up processing by avoiding the longer step of loading the values from system memory 20. A processing unit can include another cache, such as a second level (L2) cache 28 which, along with a memory controller 30, supports both of the L1 caches that are respectively part of cores 26a and 26b. Additional cache levels may be provided, such as an L3 cache 32 which is accessible via fabric bus 16. Each cache level, from highest (L1) to lowest (L3) can successively store more information, but at a longer access penalty. For example, the on-board L1 caches in the processor cores might have a storage capacity of 128 kilobytes of memory, L2 cache 28 might have a storage capacity of 4 megabytes, and L3 cache 32 might have a storage capacity of 32 megabytes. To facilitate repair/replacement of defective processing unit components, each processing unit 12a, 12b, 12c, 12d may be constructed in the form of a replaceable circuit board, pluggable module, or similar field replaceable unit (FRU), which can be easily swapped, installed in, or swapped out of system 10 in a modular fashion.

FIG. 2 illustrates further features of the cache architecture of a processor 12 in system 10, including an L1 cache 34, an L2 cache store queue 36, an L2 cache array 38, and an L2 directory array 40. As processor core 26 completes store instructions, the output data are stored in L1 cache 34 and are also sent to L2 store queue 36. L2 store queue 36 may, for example, have 32 entries (128-byte cache lines). L2 store queue 36 includes read/claim (RC) dispatch logic 42 which issues queue entries to one of several RC machines 44. RC machines 44 determine whether a requested cache line is already allocated in L2 cache array 38 (a cache hit) by reading directory array 40, and obtain ownership of any memory block as necessary to gain write permission for the cache line.

FIG. 2 also depicts pervasive logic 46 which is embedded in the integrated circuit (IC) chip comprising processing unit 12. Pervasive logic 46 is used to load (scan) information into various components of system 10, including L2 cache 14. Pervasive logic 46 communicates with a service processor 18 via an interface port 48. Interface port 48 may be a JTAG port that complies with the Institute of Electrical and Electronics Engineers (IEEE) standard 1149.1 pertaining to a test access port and boundary-scan architecture, having two data lines TDI and TDO (the test data input and output ports), a test mode select line TMS, a test clock line TCK, and a reset line TRST. JTAG interface 48 is connected to a scan communications (SCOM) controller 50 and a scan ring controller 52.

SCOM controller 50 allows the service processor to access "satellites" located in the clock-controlled (functional) components of system 10 during normal operation of the system. These SCOM satellites have internal control and error registers which can be used to enable various functions in the components. SCOM is an extension to the JTAG protocol allowed by IEEE standard 1149.1, that provides read and write access of the internal registers while leaving system clocks running. SCOM controller 50 is connected to a scan clock 54 and a functional clock 56. SCOM controller 50 may include appropriate logic to arbitrate between JTAG interface 48 and any assembly code commands from the processor cores. SCOM controller 50 may alternatively be connected to an external SCOM interface which provides chip-to-chip communications without requiring the involvement of the service processor.

Scan ring controller 52 provides the normal JTAG scan function in a level sensitive scan design (LSSD) to set the internal latch state of the system with functional clocks stopped. The internal latches are used for testing or initializing components. There may be tens of thousands of latches in a scan ring. In particular, the scan ring can include an L2 cache data input latch 58, an L2 cache control input latch 60, a directory data input latch 62, and a directory control input latch 64. These four latches are used to load appropriate program instructions and operand data into the L2 cache in order to bootstrap the system. The scan input port of cache array 38 is typically 64 bytes. A single scan input port is utilized, as it is not feasible to provide latches for every entry in the cache array.

Test software 66 running outside system 10 under the control of a user 68 can be connected to service processor 18 via, e.g. an Ethernet connection, and used to control a test procedure. In a typical test procedure involving the L2 cache, all functional clocks of processing unit 12 are stopped by SCOM controller 50 while the values for a partial cache line (64 bytes) are scanned in to latches 58, 60, 62 and 64 by pulsing scan clock 54 under the control of scan ring controller 52. Once the scan in is complete, SCOM controller 50 pulses functional clock 56 to move the values from the latches into the functional components such as L2 cache array 38 and L2 directory array 40. Testing begins after these steps have been repeated such that all of the cache lines have been so loaded into L2 cache array 38 and L2 directory array 40.

Setting up the L2 cache for testing in this manner can be very time consuming. As computer systems become more complex, it is necessary to perform more exhaustive testing to ensure that all of the system components are properly functioning. Test software 66 may accordingly take the form of an operating system such as Linux which is considerably large, e.g., two megabytes or more of program code. Since only 64 bytes of useful data can be scanned in per cycle, it takes about 50,000 scan cycles to fully scan the operating system into the cache 14, and each of these cycles requires waiting for the particular 64-byte word to propagate through thousands of latches before the next 64 bytes can be sent, resulting in a significant delay before testing or initialization can commence. It would, therefore, be desirable to devise a more efficient method of loading bootstrap or test values into a cache. It would be further advantageous if the method could take advantage of existing structures in the cache architecture to reduce any additional overhead.

SUMMARY OF THE INVENTION

It is therefore one object of the present invention to provide an improved method of loading information into a cache of a computer system in order to initialize or test the system.

It is another object of the present invention to provide such a method which does not require large numbers of scan latches within the cache array.

It is yet another object of the present invention to provide fast bootstrap loading for a cache which can take advantage of existing functional components of the computer system.

The foregoing objects are achieved in a method of loading information into a cache memory array, by scanning cache lines into a cache store queue during a scan phase, and then transmitting the cache lines from the cache store queue to the cache memory array during a functional phase. Scan circuitry stores a given cache line in a set of latches associated with one of a plurality of cache entries in the cache store queue, which then passes the cache line from the latch set to the associated cache entry. Control information may also be sent to the cache store queue. The cache lines may be scanned from test software that is external to the computer system. Read/claim dispatch logic dispatches store instructions for the cache entries to read/claim machines, and write the cache lines to the cache memory array without obtaining normal write permission, after the read/claim machines evaluate a mode bit which indicates that cache entries in the cache store queue are scanned cache lines. In the illustrative embodiment the cache memory array is part of a second level (L2) cache, and the cache store queue has a functional mode of operation wherein the cache store queue receives data from an L1 cache of the processor core and passes the data to the L2 cache memory array.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
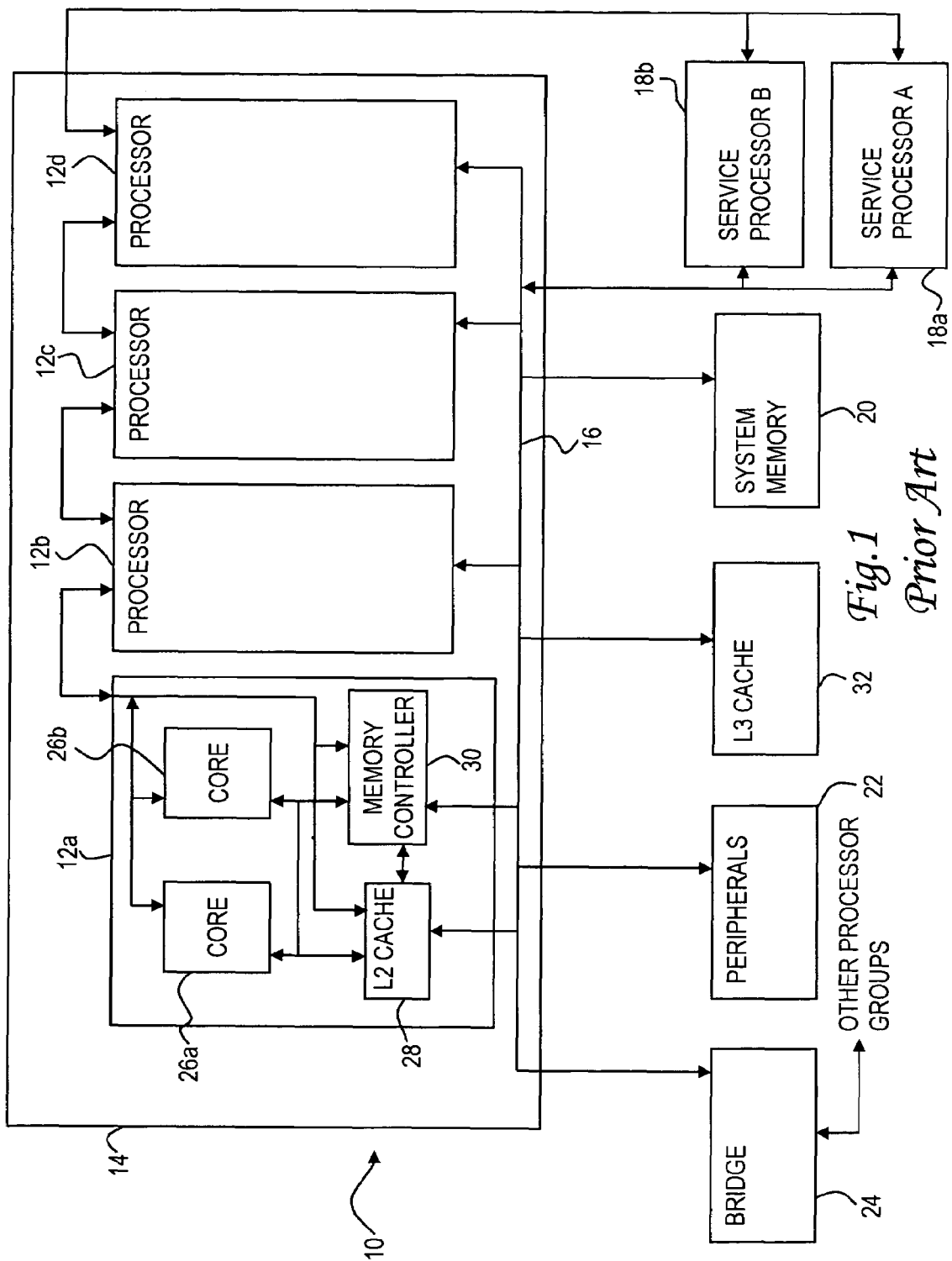
FIG. 1 is a block diagram depicting a conventional symmetric multi-processor (SMP) computer system, with internal details shown for one of the four generally identical processing units.
Figure 2:
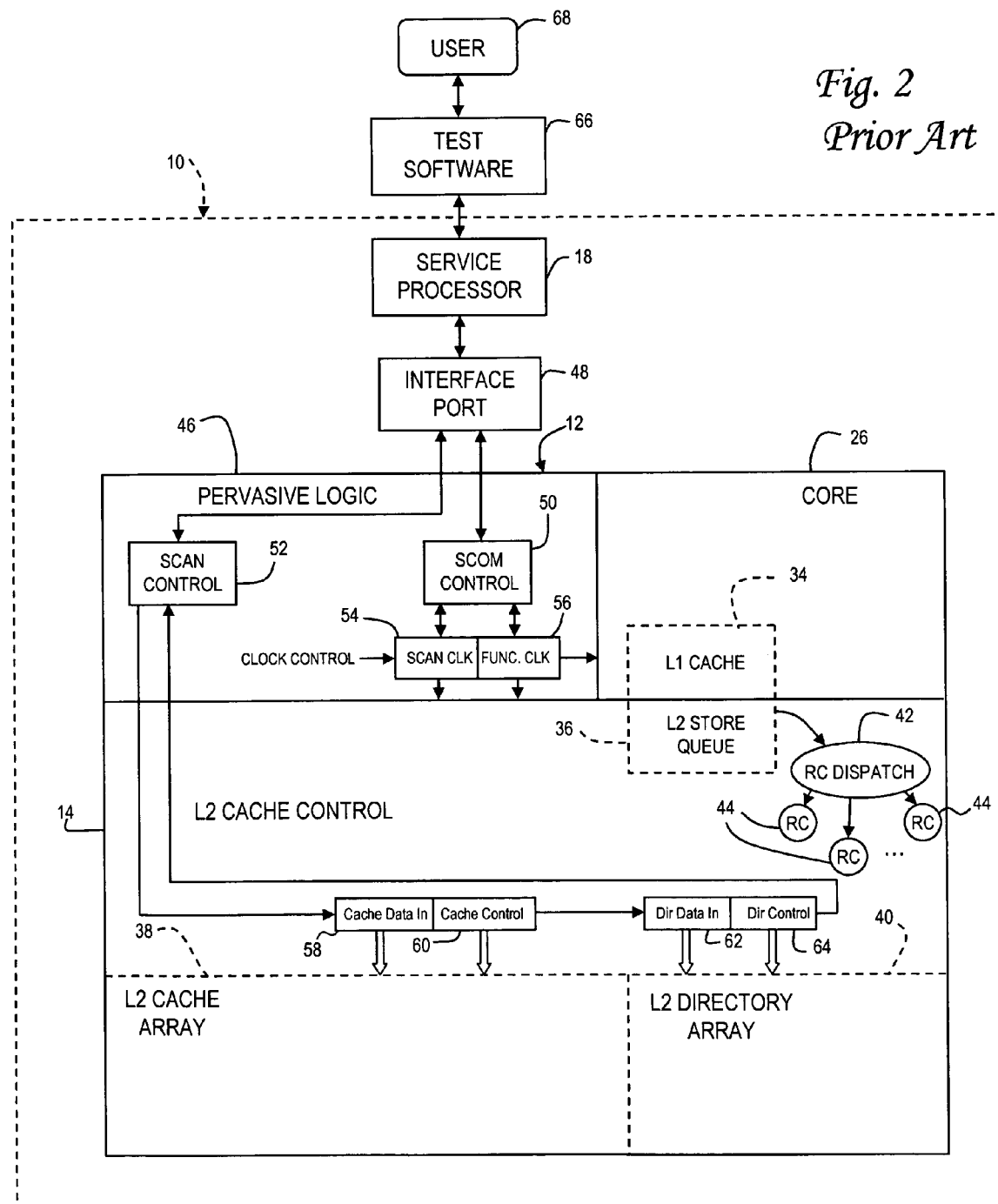
FIG. 2 is a block diagram illustrating additional details of a processing unit of FIG. 1, including an L2 cache and pervasive logic for testing functional components of the computer system.
Figure 3:
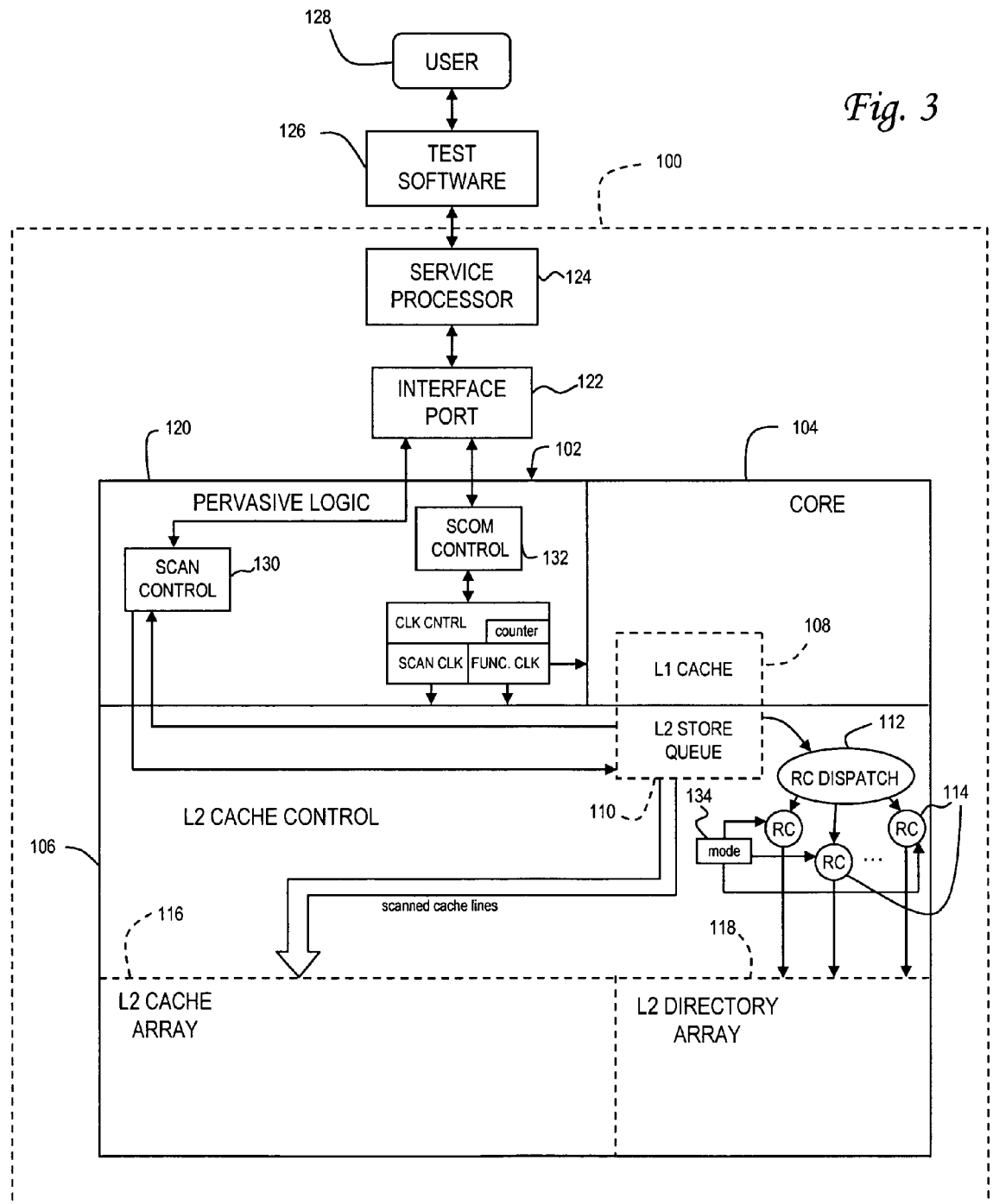
FIG. 3 is a block diagram of one embodiment of a processing unit constructed in accordance with the present invention which utilizes pervasive logic to scan information into a cache store queue, and then makes use of the normal function of the store queue to further load the information into the cache array.

With reference now to the figures, and in particular with reference to FIG. 3, there is depicted one embodiment 100 of a computer system constructed in accordance with the present invention. Computer system 100 includes a processing unit 102 having one or more processor cores 104 and a level 2 (L2) cache 106. Each processor core has its own L1 cache 108. As processor core 104 completes a store instruction, the result is stored in L1 cache 108 and is also sent to a store queue 110 of L2 cache 106. L2 store queue 110 may have 32 entries (each entry is, e.g., a 128-byte cache line). L2 store queue 110 communicates with read/claim (RC) dispatch logic 112 which issues queue entries to one of several RC machines 114. RC machines 114 determine whether a requested cache line is already allocated in L2 cache array 116 (a cache hit) based on address tag information contained in L2 directory array 118, and obtain ownership of any memory block as necessary to gain write permission for the cache line. Computer system 100 may include additional features not shown in FIG. 3, such as system memory, one or more interconnect buses, and peripheral devices.

Computer system 100 also includes pervasive logic 120 which is used to load values into internal latches and access internal registers of various components in system 100. Pervasive logic 120 may be connected to an interface (JTAG) port 122 which in turn is connected to a service processor 124. Service processor 124 receives commands via an Ethernet connection from external test software 126 which is managed by a user 128. The user controls the test software to load test data or bootstrap information into L2 cache 106. For example, the test software may instruct pervasive logic 120 to load an operating system kernel into L2 cache 106, such as a Linux operating system. While this implementation illustrates booting system 100 from an external source, those skilled in the art will appreciate that the bootstrap information could alternatively be loaded from a source internal to system 100 which is connected to service processor 124 or directly to JTAG port 122, such as firmware having a basic input/output system (BIOS) or a permanent, writable storage device (e.g., a hard drive).

Instead of scanning information into input latches at the L2 cache array and L2 directory array, the present invention scans the information (cache lines) into L2 store queue 110 during a scan phase with functional clocks turned off, and then runs the functional clocks to activate functional logic which transmits the values from store queue 110 to cache array 116. Accordingly, pervasive logic 120 includes a scan ring controller 130 which controls a scan ring that includes sets of internal latches for each of the 32 entries in store queue 110. Store queue 110 also has latches associated with its control logic and the instructions for that control logic are also scanned in. One of those control latches can be used to set a mode bit 134 that assists the read/claim machines 114 as they load the scanned cache lines from store queue 110 to cache array 116. Mode bit 134 instructs RC machines 114 to assume ownership of the cache lines, i.e., without the need for requesting write permission from the fabric bus. The mode bit can be located elsewhere such as inside RC dispatch logic 112, or could be an SCOM bit. An SCOM controller 132 is used to control both the scan clocks and the functional clocks.

This approach has several advantages over the prior art method of scanning in the cache lines to the latches of the cache and directory arrays. In a single scan phase with the prior art method only 64 bytes of useful data (half of a cache line) is loaded, but with this novel technique four kilobytes of cache lines (32 cache lines, each 128 bytes) can be loaded, which is 64 times the amount of data. With the present invention the functional clocks must be run for many more cycles to get the data loaded from the scanned L2 store queue to the L2 cache array, but this effect is negligible since the functional clock is typically much faster than the scan clock, e.g., a one gigahertz functional clock compared to a ten megahertz scan clock. Also, reducing the number of scan phases has a significant impact on reducing overall load time because each scan phase requires a considerable amount of setup time between test software 66 and service processor 18. Accordingly, the present invention provides for much faster bootstrap loading. Moreover, this benefit is achieved by adding very little hardware, since the invention takes advantage of the existing functionality of the store queue in passing the scanned cache lines on to the cache array.

Figure 4:
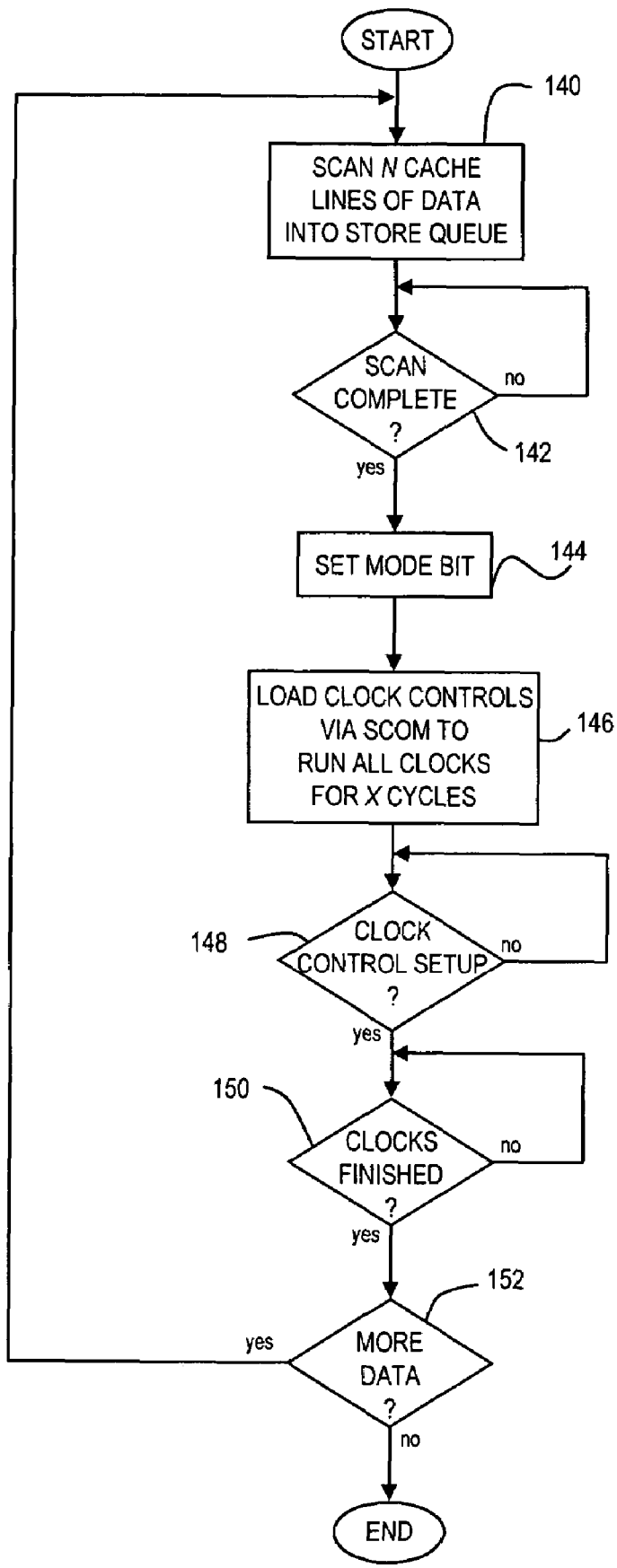
FIG. 4 is a chart illustrating the logical flow for loading data into a cache in accordance with one implementation of the present invention.

The invention may be further understood with reference to the flow chart of FIG. 4. The bootstrap or test procedure begins with a scan of N cache lines of data in the L2 store queue (140), where N is equal to or less than the number of entries in the queue. Once the scan is finished (142), the mode bit is set (144), and the clock control logic is setup via SCOM to run all functional clocks for X cycles (146), where X is the number of cycles required to place the N cache lines into the cache array from the store queue (around 1,000 cycles in an exemplary implementation). Depending on the latch construction, it may first take a cycle or two to pass the data from the internal scan latches into the queue entries. After the clock control is set up (148), and once all clocks have finished (150), the first set of cache lines have been loaded into the cache array. During this functional phase, valid entries in the store queue are marked as dispatched upon receipt of confirmation from the RC machines and, once the cache line is written to the cache array, the corresponding entry in the store queue is cleared. The entire process repeats until all of the input data has been loaded (152).

Figure 5:
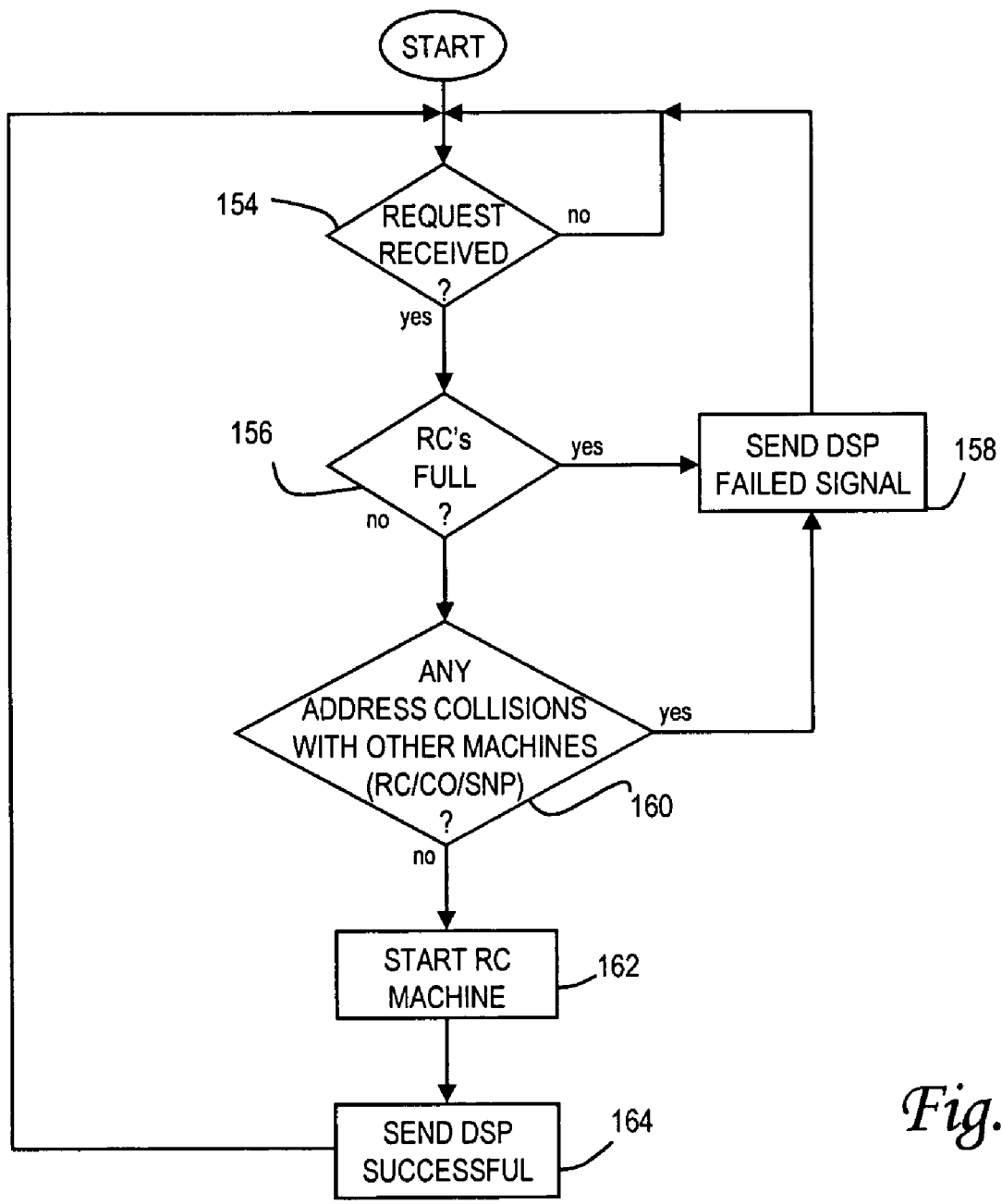
FIG. 5 is a chart illustrating the logical flow for dispatching cache lines from a store queue to a cache array in accordance with one implementation of the present invention.

FIG. 5 is another flow chart illustrating the operation of RC dispatch logic 112 during the functional phase of bootstrap loading according to one implementation of the present invention. RC dispatch logic 112 waits in an idle loop until a request is received from store queue 110 (154). Once a request is received, the dispatch logic checks to see if any RC machine 114 is available (156). If all RC machines are full (handling earlier requests) then a "dispatch failed" signal is returned to store queue 110 which must re-issue the request (158). If an RC machine is available to handle the current request, the dispatch logic next checks to see if there are any address collisions for the tag of the cache line currently being handled with other machines, including RC machines, cast-out (CO) machines, or snoop (SNP) machines (160). If there is a collision (i.e., a CO or SNP machine is already working on this cache line), the "dispatch failed" signal is again sent; otherwise, the available RC machine carries out the write to the cache array (162), which is discussed in further detail in conjunction with FIG. 6. After starting the RC machine, the dispatch logic sends a "dispatch successful" signal to store queue 110 (164).

Figure 6:
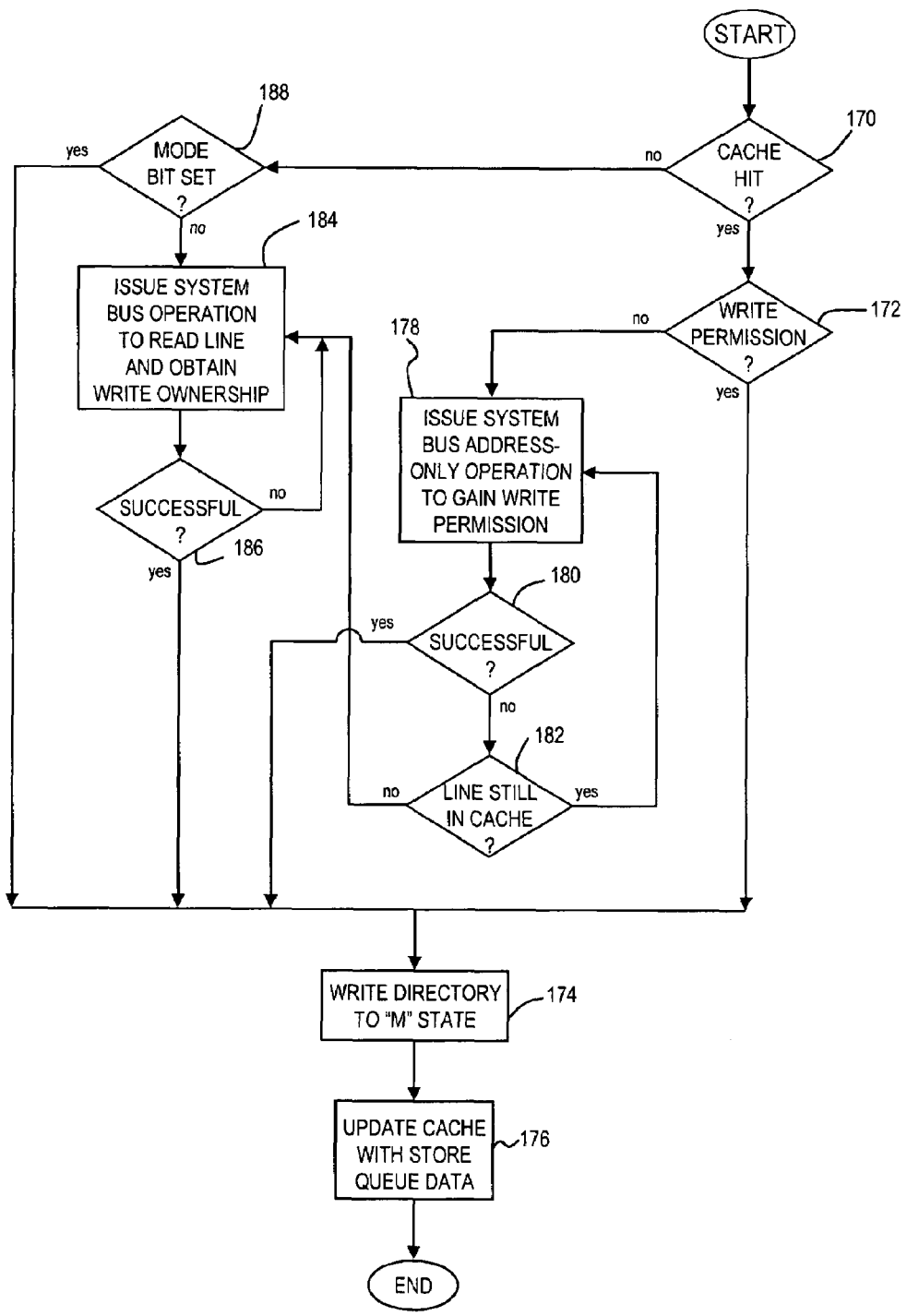
FIG. 6 is a chart illustrating the logical flow for the operation of a read/claim (RC) machine of a cache in accordance with one implementation of the present invention.

The logical flow for the operation of a given RC machine 114 is shown in FIG. 6, which begins with a determination of whether the store instruction is a cache hit (170). Mode bit 134 is ignored when the request is a hit in this implementation, since any hit cache line will already have been loaded with write permission. In this case the flow proceeds with the normal operation of RC machine 114, by examining whether this cache already has write permission for the requested memory block (172). If the cache has write permission, i.e., the cache coherency state for the cache line is some ownership state such as exclusive (E) or modified (M), then RC machine 114 writes the new coherency information to the directory array (174), and updates the cache array with the cache line from the store queue (176). If the cache does not have write permission for the memory block, it issues an address-only operation to the system bus to gain write permission (178), and awaits confirmation of success of the operation (180). If the address-only operation was not successful, the process first checks to make sure the cache line is still in the cache, that is, the address tag is still present and valid (182) and, if so, re-issues the operation. Once the operation has succeeded (write permission is obtained), the process continues by updating the directory array (174) and the cache array (176). If the cache line is no longer present at step 182, the request has effectively become a cache miss, and an operation must be issued to read the line and obtain ownership (184). This operation is repeated until it succeeds (186), and the process then continues with step 174 (where the directory is written to the "M" state which gives write permission status for future accesses) and step 176.

Returning to the initial step 170, if the request is a cache miss, the mode bit is evaluated (188). If the mode bit is not active, RC machine carries out normal operation for a cache miss beginning with step 184 as described above. If the mode bit is set, then system 100 is in bootstrap mode, and it is not necessary to obtain write permission from the memory hierarchy. In this case the process jumps to steps 174 and 176 without issuing any other operations.

The present invention may be used to test system 100 during any manufacturing stage, from wafer testing to final product testing. It is equally useful for initializing system 100, i.e., non-test bootstrap loading. The invention greatly reduces loading time which makes it feasible to boot a large operating system like Linux using the L2 cache, and faster loading leads to greatly improved throughput in wafer testing. It also allows for the boot of a system that does not have an I/O subsystem (or has a non-functioning I/O subsystem).

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the invention has been described in the context of loading information into an L2 cache, it is applicable to other cache levels and other memory structures which utilize a queue that can load an array during a functional phase. It is therefore contemplated that such modifications can be made without departing from the spirit or scope of the present invention as defined in the appended claims.

What is claimed is:

1. A method of loading information into a cache memory array, comprising:
    scanning cache lines into a cache store queue during a scan phase; and
    transmitting the cache lines from the cache store queue to the cache memory array during a functional phase, wherein said transmitting includes dispatching store instructions for the cache lines to read/claim machines, and writing the cache lines to the cache memory array without obtaining write permission, after the read/claim machines evaluate a mode bit which indicates that cache entries in the cache store queue are scanned cache lines.

2. The method of claim 1 wherein said scanning includes:
    storing a given cache line in a set of latches associated with one of a plurality of cache entries in the cache store queue; and
    passing the given cache line from the latch set to the associated cache entry.

3. The method of claim 2 wherein said scanning further includes sending control information to the cache store queue.

4. The method of claim 1 wherein the cache memory array is part of a computer system, and the cache lines are scanned from test software that is external to the computer system.

5. The method of claim 1 wherein the cache memory array is part of a second level cache, and the cache store queue has a functional mode of operation wherein the cache store queue receives data from a first level cache and passes the data to the cache memory array.

* * * * *